US007136325B2

(12) United States Patent
Polom

(10) Patent No.: US 7,136,325 B2
(45) Date of Patent: Nov. 14, 2006

(54) VIBRATION GENERATOR FOR SEISMIC APPLICATIONS

(75) Inventor: Ulrich Polom, Seesen-Muenchehof (DE)

(73) Assignee: Institut fuer Geowissenschaftliche Gemeinschaftsaugaben, Hannover (DE)

( * ) Notice: Subject to any disclaimer, the term of this patent is extended or adjusted under 35 U.S.C. 154(b) by 502 days.

(21) Appl. No.: 10/630,273

(22) Filed: Jul. 30, 2003

(65) Prior Publication Data
US 2005/0102105 A1 May 12, 2005

(30) Foreign Application Priority Data
Aug. 1, 2002 (DE) ................................ 102 35 126

(51) Int. Cl.
*G01V 1/04* (2006.01)
(52) U.S. Cl. ...................................... 367/189; 181/113
(58) Field of Classification Search ................ 367/182, 367/189; 181/113
See application file for complete search history.

(56) References Cited

U.S. PATENT DOCUMENTS 3,287,696 A * 11/1966 Cholet et al. ............... 367/189

3,716,111 A * 2/1973 Lavergne .................... 181/113

FOREIGN PATENT DOCUMENTS

WO   WO 90/14169   * 11/1990

* cited by examiner

*Primary Examiner*—Ian J. Lobo
(74) *Attorney, Agent, or Firm*—Myron Greenspan; Lackenbach Siegel LLP

(57) ABSTRACT

A vibration generator can be used for seismic applications, producing vibrations for exploration of near-surface subsoils up to 150 meters. Containing two coils activated with AC current or other electrical pulses, the generator is coupled to the object to be investigated by suitable elements. Inside is an inner housing, the outer housing movably supporting, on opposing sides, two coils connected through the inner housing. One coil is activated continuously and alternates with a positive wave component of an AC current control signal; at the same time the other coil alternates with a negative wave component. The result, a controlled vibratory motion, is also achieved with DC voltage. Because of the law of action and reaction, the vibratory motion passed to the coupling elements allows motion into the object being investigated. In contrast to conventional moving coil systems for electromechanical vibration transduction, this generator is based on a soft-metal magnetic instrument.

13 Claims, 1 Drawing Sheet

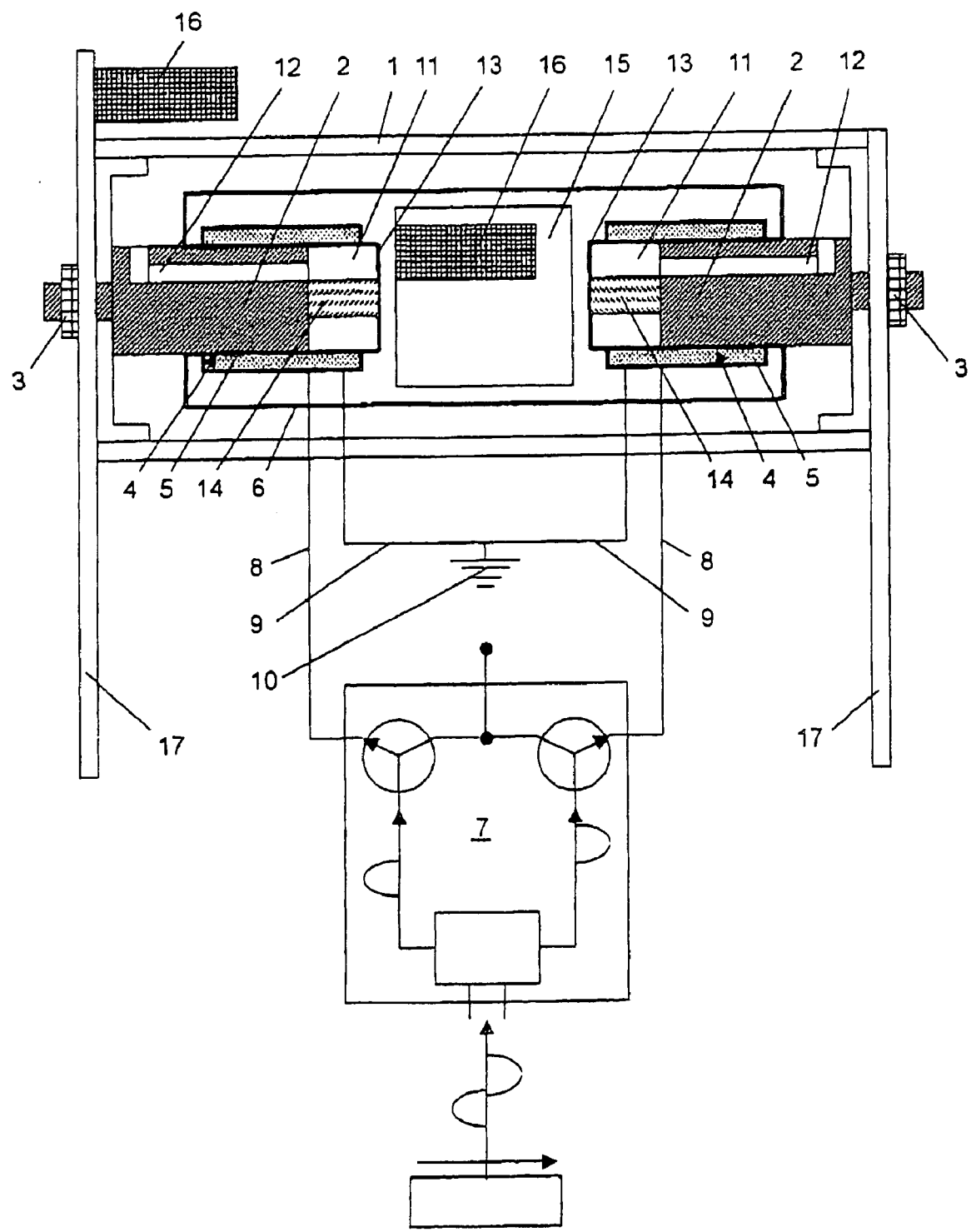

VIBRATION GENERATOR FOR SEISMIC APPLICATIONS

BACKGROUND OF THE INVENTION

1. Field of the Invention

The invention relates to a vibration generator for seismic application comprising a housing, in which coils, activated with AC current or electric pulses, are accommodated and which is coupled via a coupling element to the investigation object.

2. Description of the Related Art

In raw material exploration seismic vibration methods for the geophysical exploring of deep subsoil structures and material properties are employed. For this purpose longitudinal and transverse waves are applied. The essential advantages of the method are the controllable signal, the high-grade reproducibility, the exact determination of the signal delay time and the damage and environtal endangerment which are low in comparison to pulse sources (for example explosives).

The same methodology is also suitable for exploring near-surface subsoil of up to a few hundred meters depth for geophysical engineering tasks. However, as a rule, the equipment utilized in the exploration for seismic excitation is too large for near-surface applications, too heavy and technically too elaborate, due to the customarily used servohydraulic driving technology to be able to employ it at justifiable costs on a considerably size-reduced scale.

For near-surface tasks with vibration processes, electric driving systems are better suited, since they require considerably less technical expenditures. Vibration generators driven in this way are successfully employed for example in stationary material testing. In these systems, moving coil systems (deflection of a coil in a toroidal core magnet) similar to a dynamic loudspeaker are utilized for converting electrical into mechanical energy. Technically problematic is the precise friction-less guidance of the moving coil in the toroidal core in the presence of radial forces. Furthermore, powerful permanent toroidal magnets necessitate a large weight.

SUMMARY OF THE INVENTION

Equipment taken over from this technique is also already used for near-surface geophysical exploration. However, the systems available on the market are unwieldy for use in the field due to their comparatively large weight (approximately 100 kg for a transverse wave exciter without supply unit). Taking into consideration permissible carrying weights for persons, at least 4 persons are necessary for the transport in the field. Furthermore, the necessary supply with 220 or 110 V mains voltage or power generators leads to logistic and also process-dependent disadvantages due to possible inductive interference currents. In this connection, endangerment of the environment through the life-threateningly high voltage, due to cables which could possibly be damaged, can also not be excluded.

The invention eliminates the disadvantages of prior art. The invention addresses the problem of providing a readily portable and easily wieldable vibration generator with which vibrations for geophysical explorations of near-surface subsoil structures can be carried out up to a depth of approximately 150 meters.

The invention comprises that in the outer housing of the vibration generator an inner housing is disposed, that the outer housing on opposing sides supports two coil cores, on each of which one coil is displaceably supported and that the two coils are connected with one another through the inner common housing, with the two coils being alternately activated with electric energy.

If one coil is activated continuously alternating initially with the positive wave component of an AC current control signal and the other coil with the negative wave component, a force-driven vibration motion results of the reaction mass as a function of the applied AC current frequency. The same effect is obtained with alternating application of a DC voltage to the two coils. Via the law of action and reaction this motion is transmitted to the coupling element and in this way permits introducing the vibration motion into the object to be investigated.

In contrast to the moving coil system conventionally used for electromechanical vibration transduction, the system according to the invention is based on the functional operation of a soft-iron instrument, such as is also used, for example, in electrically controlled magnetic valves. To generate a motion in the opposite direction, two of these function elements connected oppositely are combined. The coupled coil elements and the inner housing encompassing it form the movable reaction mass (inert mass). The coil cores to be magnetized of a magnetically soft material are fixedly connected with the outer housing (which is produced of a light material which is also a good heat conductor, such as aluminum), also for the reason to provide sufficient dissipation of the heat generated by the eddy currents in the cores. In principle, as an alternative an interchanged disposition of coil elements and cores is also possible, however, in that case the dissipation of the heat generated in the cores is problematic. The outer housing functioning as a coupling element to the object of investigation is connected, depending on the requirement, via a friction coupling, grooved rakes or bolt connections, force-fittingly under elastic aspects with the object of the investigation.

Since the direction in which the current flows through the coil is insignificant for the functional operation of a soft-iron instrument, one of the poles of each coil are connected together, which functions as mass. If one coil is activated with current via the second pole of the coil, the magnetically soft core (ferromagnetic) in this coil is magnetized and pulled with great force into the magnetic field of the coil. This leads to a movement of the reaction mass to this core side. When the current is switched off, this force effect abruptly ceases. The second coil acts in identical manner for the opposite direction of motion. The guidance of the coil element takes place via the cylindrical core through a thin-walled brass tube (diamagnetic) in the interior of the coil bodies, with the transition being laid out as a slide fit with permanent lubricant. In this way radial forces of a considerable order of magnitude can be absorbed. Two springs disposed between the coil elements and the cores or, alternatively, between the coil elements and the coupling housing serve for positioning the reaction mass in the zero position when the control signal is switched off. The spring forces are of an order of magnitude below the electromagnetically initiated forces and virtually do not affect them. To avoid a damping air packet in the core head volume, it is vented via a channel.

As a function of the polarity and amplitude of a fed-in control signal, the control electronics of the device distributes the applied supply current (for example battery, 12–24 V) to the two coils. In this way, the mechanical motion can be modulated with respect to amplitude and frequency. For the device described here, a rectangular control signal is primarily employed, since, due to the mass inertia, the precise amplitude form of the control signal is of secondary importance. The mass inertia of the mechanical system forms a sinusoidal mechanical motion from the frequency-modulated rectangular control signal. To regulate the mechanical forces, the pulse width of the control signal can also be utilized.

Special advantages of this functional principle are:
no permanent magnets are required, which results in small masses and dimensions,
the resulting force is proportional in the square to the initiating current,
due to the low supply voltage of preferably 12–24 V, endangering the environment in field operation is virtually impossible.

The structure of this vibration generator is especially simple and its operating function independent of radial disturbances if between the coil cores and the coils a sleeve is disposed as a slide fit, which is comprised of a material having good sliding properties and being magnetically neutral (for example diamagnetic). A brass sleeve is preferably disposed as a slide fit.

This vibration generator supports ease of manufacture thereby that the inner housing at its two frontal faces includes one hollow volume each, each of which is encompassed by the coil and into which the coil cores project.

For reasons of the simple structure, appropriate to its use, of this vibration generator, it is advantageous if the hollow volume, which is each encompassed by the coil and into which the coil cores project, is closed off toward the inside by a bottom, which is a portion of the inner housing.

For the zero position adjustment of this vibration generator it is advantageous, if at the front faces between the coil cores and the inner housing one spring each is disposed. Through suitable choice of the zero adjustment springs, static forces (for example earth's gravity) acting from the outside can also be compensated if the vibration exciter is not horizontally positioned.

To be able to apply this vibration generator with different vibration masses, it is advantageous if the inner housing comprises space for an insertable additional mass.

To allow this vibration generator to operate effectively in simple manner, it is useful if the coils are fed from an electronic control device, which outputs electric oscillations or pulses alternating in time to the coils.

To be able to adapt the vibrations of this vibration generator to the requisite measuring considerations and measuring objects, it is useful that initially the outer and/or the inner housing is provided with an acceleration pickup, in order to be able in this case subsequently to carry out a favorable setting of the control device based on the measured acceleration values.

It is favorable for this vibration generator if the coil cores are comprised of a magnetically soft metal alloy.

In order to obtain in this vibration generator unbraked and undamped vibrations, it is advantageous if the coil cores are provided with a venting channel, which extends from the core head volume into the outer housing.

The special application field of this vibration exciter is the near-surface seismic exploration up to preferably 150 m penetration depth with artificial signal sources, but it can also be utilized in material testing. The vibration exciter generates a frequency-modulated mechanical transverse oscillation, predetermined by an electric control signal, with defined length and modulation preferably in the frequency range of 1 Hz to 300 Hz. The wave train generated in this way propagates as an elastic wave (shear wave) with a velocity typical of the material (shear wave velocity) in the investigation object, is reflected and registered by suitable sensors (geophones or acceleration pickups) disposed on the investigation object and stored in digital form. Subsequently a cross correlation of these registered signals takes place with an identically modulated correlation operator, which, as a rule, is developed sinusoidally in order to avoid harmonics. The result of this operation is a pulse-form signal, on the basis of whose propagation time delay, compared to the initial signal, the material velocity and material structure can be determined by means of the wave path.

Due to the electric control and electromechanical transduction, the initial signal is reproducible to a high degree, such that a stacking of any number of signal excitations is possible without loss of quality. Through the correlation process, the exact time adjustment with the control signal and the motion behavior, tapped off by means of the acceleration pickups, can be attained such that, compared to the pulse method, a considerably more precise velocity determination is possible. Due to the time extension of the signal, with the excitation only small instantaneous forces occur, which permit a virtually destruction-free object investigation.

The vibration pickup according to the invention can comprise different fastening means for the coupling to the investigation object or to the subsoil.

To couple the vibration generator for example to soft subsoil, the fastening means rake can be applied and to rock an angle sheet metal which can be screw-fastened to such.

The vibration exciter can be applied in particular in
refraction seismic processes
reflection seismic processes
vertical seismic processes (VSP)
tomographic seismic processes.

BRIEF DESCRIPTION OF THE DRAWING

What follows is an explanation of the essence of the invention in further detail in conjunction with one embodiment that is represented schematically in the drawing. The one drawing depicts a block circuit diagram of the vibration generator according to the present invention.

DETAILED DESCRIPTION OF THE EMBODIMENTS OF THE INVENTION

The device described in the following and depicted in the drawing makes possible the frequency-modulated excitation of transverse waves preferably in the frequency range of 1–300 Hz from a DC current energy source utilizing for example a commercially available 12 V car battery. At a net weight of approximately 5 kg, the device can be transported by one person without any problems.

In an outer housing 1 coil cores 2 are installed on opposing sides with the aid of bolted joints 3. On these coil cores 2 slide brass sleeves 4 which are encompassed by coils 5 and which are parts of the inner housing 6.

The coils 5 are activated from the control device 7 via electric lines 8 alternating in time. The coils 5 are both connected via one cable 9 each to the electrical ground 10.

As a component of the inner housing 6 the coils 5 vibrate continuously back and forth during operation. The hollow volumes 11, encompassed by the coils, into which extend the coil cores 2, must be ventilated and vented if the vibration of the inner housing 6 is to take place freely and undamped. For this ventilating and venting in the coil cores 2 channels 12 are provided. But the ventilation and venting could also take place through holes in the bottoms 13 of the hollow volumes 11. Springs 14 between the bottoms 13 and the front faces of the coil cores 2 serve for the purpose of defining a zero position of the inner housing 6.

The inner housing 6 comprises between the two hollow volumes 11 a volume 15 for the introduction of an additional mass. In the inner housing 6 as well as also on the outer housing 1 is disposed an acceleration measuring device 16. The coupling elements 17 disposed on the outer housing 1 represent rakes, with which the vibration pickup according to the invention is coupled to investigation objects, also not shown.

The invention claimed is:

1. Vibration generator comprising an outer housing, coupling means for coupling said outer housing to an object to be investigated; a pair of opposing coil cores mounted within said outer housing; a pair of coils each movably mounted on an associated coil core; an inner housing arranged within said outer housing and fixedly secured to said coils; energizing means for alternatively energizing said coils to move each coil when energized in a direction opposite to the direction in which the other coil moves when said other coil is energized, whereby said inner housing is caused to reciprocate within said outer housing, and vibrations are imparted to the outer housing and in this way to the object to be investigated.

2. Vibration generator as claimed in claim 1, further comprising sliding promotion means between said coil cores and said coils of a magnetically neutral material for promoting sliding movements between said coils and associated coil cores.

3. Vibration generator as claimed in claim 2, wherein said sliding promotion means comprises brass sleeves.

4. Vibration generator as claimed in claim 1, wherein said inner housing has a hollow volume on each of two frontal faces that receives a coil and into which said coil cores project.

5. Vibration generator as claimed in claim 4, wherein each hollow volume, is encompassed by a coil into which an associated coil core projects, is closed toward the other volume by a bottom that is a portion of said inner housing.

6. Vibration generator as claimed in claim 5, wherein a spring is disposed at said frontal faces between said coil cores and said bottoms of said inner housing.

7. Vibration generator as claimed in claim 1, wherein said inner housing comprises a volume for inserting additional mass.

8. Vibration generator as claimed in claim 1, wherein said energizing means comprises an electronic control device that outputs to said coils electric oscillations or pulses, which have opposite polarities.

9. Vibration generator as claimed in claim 1, wherein at least one of said outer and/or inner housings is provided with an acceleration pickup.

10. Vibration generator as claimed in claim 1, wherein said coil cores are comprised of a magnetically soft metal alloy.

11. Vibration generator as claimed in claim 1, wherein said coil cores are each provided with a venting channel that extends from a volume of said outer housing to an associated hollow volume of said inner housing.

12. Vibration generator as claimed in claim 1, wherein said outer housing coupling elements are provided for coupling said generator to the object to the investigated.

13. Vibration generator as claimed in claim 1, wherein a brass sleeve is disposed between each coil and associated coil core.

* * * * *